US012397543B2

(12) United States Patent
Shimomura

(10) Patent No.: US 12,397,543 B2
(45) Date of Patent: Aug. 26, 2025

(54) INKJET PRINTER

(71) Applicant: RISO KAGAKU CORPORATION, Tokyo (JP)

(72) Inventor: Kenji Shimomura, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 174 days.

(21) Appl. No.: 18/229,845

(22) Filed: Aug. 3, 2023

(65) Prior Publication Data

US 2024/0075734 A1 Mar. 7, 2024

(30) Foreign Application Priority Data

Sep. 7, 2022 (JP) ................................ 2022-142314

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ...................................................... B41J 2/2139
See application file for complete search history.

(56) References Cited

U.S. PATENT DOCUMENTS 6,908,176 B2 6/2005 Koitabashi et al.
7,484,830 B2 * 2/2009 Kim ....................... B41J 2/2146 347/42
2013/0241987 A1 * 9/2013 Hatanaka ............... B41J 2/2146 347/14

FOREIGN PATENT DOCUMENTS

JP 2002-19101 A 1/2002
JP 4681751 B2 * 5/2011 .......... B41J 2/16579
WO WO-2018052031 A1 * 3/2018 ............ B41J 2/0451

* cited by examiner

*Primary Examiner* — Sharon Polk
(74) *Attorney, Agent, or Firm* — GREENBLUM & BERNSTEIN, P.L.C.

(57) ABSTRACT

An inkjet printer includes nozzle arrays and a controller. Each of the nozzle arrays includes nozzles arranged in a row along a nozzle array direction. The nozzle arrays are arranged in parallel with each other in a direction perpendicular to the nozzle array direction. The controller is configured to perform such control that in a case where the nozzle arrays include a first nozzle array including a non-ejection nozzle, a defect in a printed image due to the non-ejection nozzle is interpolated by using ejection of an ink by a first nozzle and at least one second nozzle in a second nozzle array different from the first nozzle array among the nozzle arrays, the first nozzle being at a position corresponding to a pixel onto which the non-ejection nozzle is intended to eject an ink, the at least one second nozzle being adjacent to the first nozzle.

5 Claims, 12 Drawing Sheets

FIG. 4

21

| AVERAGE VALUE OF THE NUMBERS OF DROPS OF ADJACENT PIXELS | THE NUMBER OF DROPS ADDED | PERIPHERAL PIXEL ADAPTATION AMOUNT |
|---|---|---|
| 0 | ±0 | ±0 |
| 0< AND ≤1 | ±0 | ±0 |
| 1< AND ≤2 | ±0 | ±0 |
| 2< AND ≤3 | +1 | +1 |
| 3< AND ≤4 | +2 | +1 |
| 4< AND ≤5 | +2 | +1 |
| 5< AND ≤6 | +3 | +1 |
| 6< AND ≤7 | +3 | +1 |
| … | … | … |

AR14A

AR14B

AR14C

INKJET PRINTER

CROSS-REFERENCE TO RELATED APPLICATIONS

The present application is based on and claims the benefit of priority from the prior Japanese Patent Application No. 2022-142314, filed on Sep. 7, 2022, the entire contents of which are incorporated by reference herein.

TECHNICAL FIELD

The disclosure is directed to an inkjet printer.

BACKGROUND

In inkjet printers, there is a case where clogging occurs due to dust or the like to generate a non-ejection nozzle which cannot eject an ink. A non-ejection nozzle causes a white streak (defect) to be generated in a printed image, which lowers a printed image quality.

Japanese Unexamined Patent Application Publication No. 2002-19101 proposes a technique of interpolating a white streak by ejecting an ink at a position of the white streak by using a nozzle array that ejects an ink of a color different from that of a nozzle array including a non-ejection nozzle.

SUMMARY OF THE INVENTION

In the above-described technique, the ink of a different color is ejected onto only pixels where the white streak has occurred. For this reason, there is a case where a white streak cannot be sufficiently interpolated, so that a decrease in printed image quality cannot be suppressed, when landing position deviation occurs due to the meandering of a sheet, displacement of an attachment position of an inkjet head, or the like.

The disclosure is directed to an inkjet printer that is capable of suppressing a decrease in printed image quality due to a non-ejection nozzle.

An inkjet printer in accordance with some embodiments includes nozzle arrays and a controller. Each of the nozzle arrays includes nozzles arranged in a row along a nozzle array direction. The nozzle arrays are arranged in parallel with each other in a direction perpendicular to the nozzle array direction. The controller is configured to perform such control that in a case where the nozzle arrays include a first nozzle array including a non-ejection nozzle, a defect in a printed image due to the non-ejection nozzle is interpolated by using ejection of an ink by a first nozzle and at least one second nozzle in a second nozzle array different from the first nozzle array among the nozzle arrays, the first nozzle being at a position corresponding to a pixel onto which the non-ejection nozzle is intended to eject an ink, the at least one second nozzle being adjacent to the first nozzle.

The above-described configurations make it possible to suppress a decrease in printed image quality due to a non-ejection nozzle.

BRIEF DESCRIPTION OF DRAWINGS

FIG. 4 is a diagram illustrating an interpolation table.

DETAILED DESCRIPTION OF THE INVENTION

Figure 1:
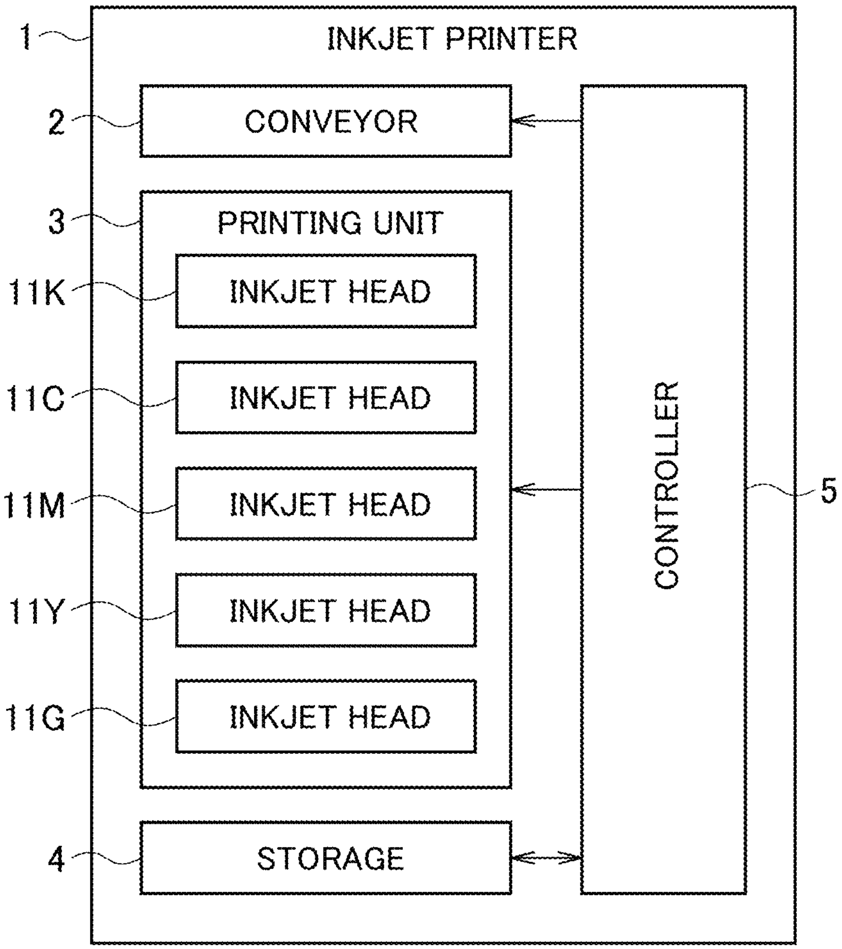
FIG. 1 is a block diagram illustrating a configuration of an inkjet printer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
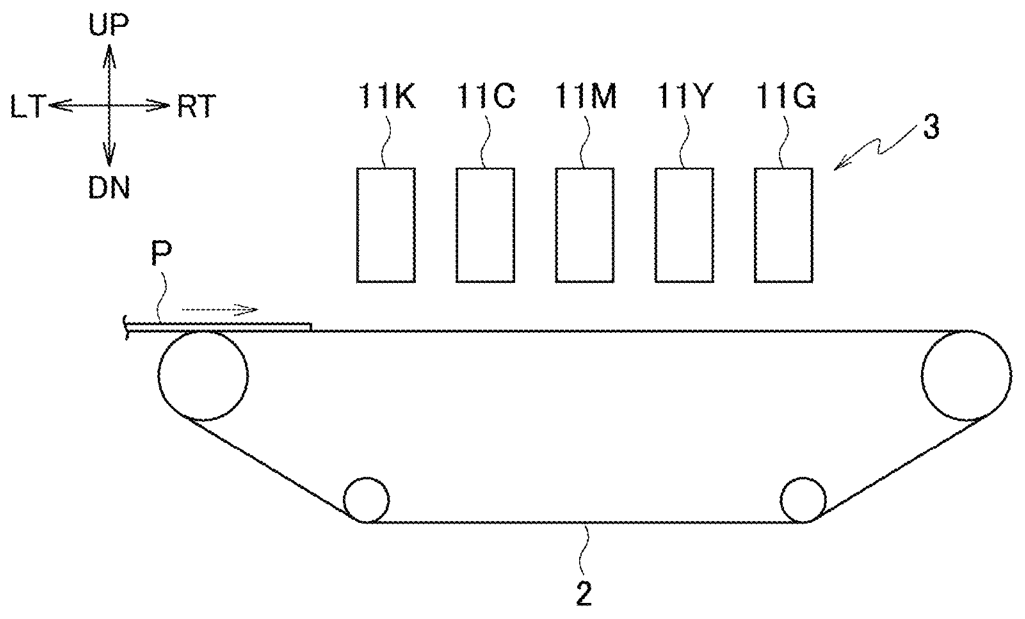
FIG. 2 is a schematic configuration diagram of a conveyor and a printing unit of the inkjet printer of FIG. 1.
Figure 3:
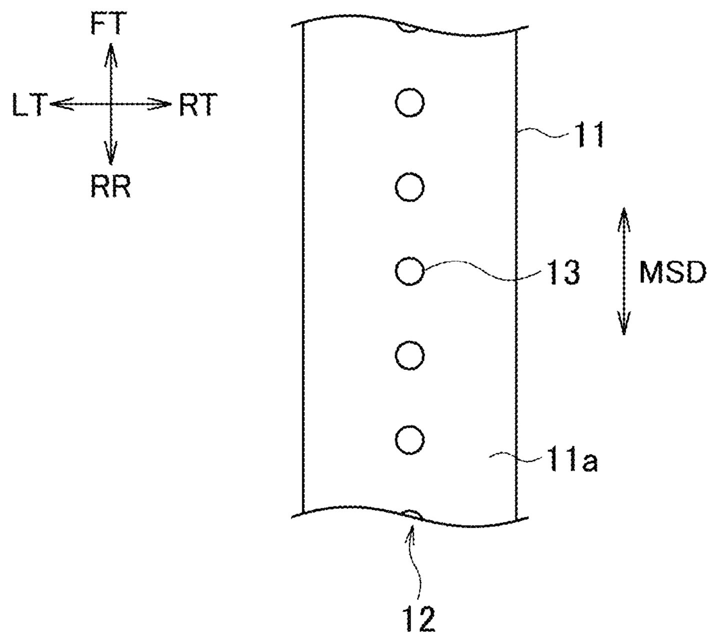
FIG. 3 is a schematic configuration diagram of an inkjet head of the inkjet printer of FIG. 1.

FIG. 1 is a block diagram illustrating a configuration of an inkjet printer 1 according to an embodiment of the present invention. FIG. 2 is a schematic configuration diagram of a conveyor 2 and a printing unit 3 of the inkjet printer 1 illustrated in FIG. 1. FIG. 3 is a schematic configuration diagram of an inkjet head 11 of the inkjet printer 1 illustrated in FIG. 1. Note that in the following description, up, down, left, and right in the sheet surface of FIG. 2 are referred to as upward, downward, left, and right directions. In addition, a direction perpendicular to the sheet surface in FIG. 2 is referred to as a front-rear direction, and a direction from the sheet surface to viewers is referred to as front. In FIGS. 2, 3, 16 to 12, the right direction, the left direction, the upward direction, the downward direction, the front direction, the rear direction, a main-scanning direction, and a sub-scanning direction are referred to as RT, LT, UP, DN, FT, RR, MSD, and SSD, respectively.

As illustrated in FIG. 1, the inkjet printer 1 includes the conveyor 2, the printing unit 3, a storage 4, and a controller 5.

The conveyor 2 is configured to convey a sheet P, which is a print medium fed from a sheet feeder which is not illustrated, while sucking and holding the sheet P on a conveyor belt. The direction from the left side to the right side in FIG. 2 is a conveying direction of the sheet P.

The printing unit 3 is configured to print an image on the sheet P conveyed by the conveyor 2. The printing unit 3 is arranged above the conveyor 2. The printing unit 3 includes inkjet heads 11K, 11C, 11M, 11Y, and 11G. Note that in some cases, the inkjet heads 11K to 11G are collectively described by omitting the attached alphabets in the reference signs.

The inkjet head 11 is configured to eject an ink onto the sheet P conveyed by the conveyor 2. The inkjet heads 11K, 11C, 11M, 11Y, and 11G are configured to eject inks of black (K), cyan (C), magenta (M), yellow (Y), and gray (Gray), respectively. The inkjet heads 11K to 11G are arranged in parallel with each other in the sub-scanning direction (the left-right direction), which is the conveying direction of the sheet P, above the conveyor 2.

The inkjet head 11 includes a nozzle array 12 as illustrated in FIG. 3. The nozzle array 12 is formed with multiple nozzles 13 arranged in a row along the main-scanning direction (a nozzle array direction), which is a direction (the front-rear direction) perpendicular to the conveying direction of the sheet P. Since each of the inkjet heads 11K to 11G includes the nozzle array 12, the printing unit 3 includes five nozzle arrays 12 arranged in parallel with each other in the sub-scanning direction (the left-right direction). The inkjet heads 11K to 11G are arranged such that the positions of the respective nozzles 13 in the main-scanning direction coincide among the inkjet heads 11K to 11G. Note that FIG. 3 is a diagram of the inkjet head 11 as viewed from below.

The nozzles 13 eject an ink. The nozzles 13 are open in a nozzle face 11*a* which is a lower face of the inkjet head 11.

The inkjet head 11 is of multi-drop system which is capable of ejecting multiple ink drops from one nozzle 13 onto one pixel, and is configured to perform gradation printing which expresses density by means of the number of drops (ejection amount), which is the number of ink drops.

The inkjet head 11G is used for interpolating a white streak (defect) in a printed image which is caused by a non-ejection nozzle 13 in at least one of the other inkjet heads 11K to 11Y in the case where printing is performed in a white streak interpolation mode. That is, the nozzle array 12 of the inkjet head 11G has a function as a nozzle array 12 configured to interpolate a white streak caused by a non-ejection nozzle 13 in at least one of the respective nozzle arrays 12 of the other inkjet heads 11K to 11Y.

Here, the ink of gray, which is ejected by the inkjet head 11G, is an achromatic ink having a higher brightness than that of the ink of black having the lowest brightness among the inks of black, cyan, magenta, and yellow which are ejected respectively by the other inkjet heads 11K to 11Y. This makes it possible to interpolate a white streak while suppressing a decrease in printed image quality occurring when an ink for interpolating a white streak is excessively noticeable.

The above-described white streak interpolation mode is a mode in which to perform a printing process including a process of interpolating a white streak in a printed image which is caused by a non-ejection nozzle 13 in the case where the non-ejection nozzle 13 is in at least one of the inkjet heads 11K to 11Y. In the inkjet printer 1, for example, printing in the white streak interpolation mode can be set in accordance with an operation made by the user on an operation panel which is not illustrated.

The storage 4 stores various programs. In addition, the storage 4 stores an interpolation table 21 illustrated in FIG. 4. The storage 4 includes an HDD (Hard Disk Drive) and the like.

The interpolation table 21 is a table in which an average value of the numbers of drops of adjacent pixels, the number of drops added, and a peripheral-pixel adaptation amount are associated with one another. The interpolation table 21 is used in printing in the above-described white streak interpolation mode.

The average value of the numbers of drops of adjacent pixels is an average value of the number of drops (ejection amount) onto a pixel onto which nozzles 13 that are adjacent to the front side of a non-ejection nozzle 13 eject the inks (a pixel that is adjacent to one side, in the main-scanning direction, of a pixel onto which the non-ejection nozzle 13 is intended to eject the ink) and the number of drops (ejection amount) onto a pixel onto which nozzles 13 that are adjacent to the rear side of the non-ejection nozzle 13 eject the inks (a pixel that is adjacent to the other side, in the main-scanning direction, of the pixel onto which the non-ejection nozzle 13 is intended to eject the ink). Note that in the case where the non-ejection nozzle 13 is a nozzle 13 at the front or rear end, the average value of the numbers of drops of adjacent pixels is calculated by regarding the number of drops on the side where there is no adjacent nozzle 13 as "0".

Here, the number of drops onto the pixel onto which the nozzles 13 that are adjacent to the front side of the non-ejection nozzle 13 is a sum of the numbers of drops ejected by the inkjet heads 11K to 11Y onto that pixel in a printed image. Similarly, the number of drops onto the pixel onto which the nozzles 13 that are adjacent to the rear side of the non-ejection nozzle 13 is a sum of the numbers of drops ejected by the inkjet heads 11K to 11Y onto that pixel in a printed image.

The number of drops added is the number of drops (ejection amount) of the ink ejected for interpolating a white streak by each nozzle 13 used when the inkjet head 11G interpolates a white streak. The nozzles 13 used when the inkjet head 11G interpolates a white streak are nozzles 13 within a range specified in accordance with the position of the non-ejection nozzle 13 and the peripheral-pixel adaptation amount.

The peripheral-pixel adaptation amount is for specifying the range (the number) of nozzles 13 that eject the ink for interpolating a white streak around a nozzle 13 at the position corresponding to the non-ejection nozzle 13 (the pixel having the white streak) in the main-scanning direction (at the same position in the main-scanning direction). The peripheral-pixel adaptation amount indicates the number of nozzles 13 that eject the ink for interpolating a white streak on each of the front and rear sides of the nozzle 13 at the position corresponding to the non-ejection nozzle 13.

For example, in the case where the peripheral-pixel adaptation amount is "+1", three nozzles 13 in the inkjet head 11G, that is, a nozzle 13 at the position corresponding to the non-ejection nozzle 13 which is in another inkjet head 11, and two nozzles 13 adjacent respectively to the front and rear sides of that nozzle 13 at the corresponding position are used in interpolating a white streak. Note that in the case where the non-ejection nozzle 13 is a nozzle 13 at the front or rear end, two nozzles 13, that is, a nozzle 13 at the position corresponding o the non-ejection nozzle 13 and one nozzle 13 adjacent to the front or rear side of that nozzle 13 are used in interpolating a white streak.

The above-described number of drops added and peripheral-pixel adaptation amount are set in accordance with the average value of the numbers of drops of adjacent pixels in such a manner as to be able to interpolate a white streak while suppressing the appearing of a black streak which occurs when pixels in the periphery of the white streak are emphasized by bleeding of the inks being ejected for interpolating the white streak. Here, in the example of FIG. 4, in the case where the average value of the numbers of drops of adjacent pixels is equal to or lower than a prescribed value ("2" in the example of FIG. 4), the number of drops added and the peripheral-pixel adaptation amount are set to "±0". That is, in the example of FIG. 4, in the case where the average value of the numbers of drops of adjacent pixels is equal to or lower than the prescribed value, ejection of the ink for interpolating a white streak is omitted.

The controller 5 is configured to control the operation of the entire inkjet printer 1. The controller 5 includes a CPU, a RAM, a ROM, and the like.

Specifically, the controller 5 controls the operation such that the inkjet heads 11K to 11Y eject the inks onto the sheet P to make printing while the conveyor 2 is conveying the sheet P.

In addition, in the case where printing in the white streak interpolation mode has been set and there is a non-ejection nozzle 13 in at least one of the inkjet heads 11K to 11Y, the controller 5 controls the printing unit 3 to interpolate a white streak due to the non-ejection nozzle 13 by using the ejection of the ink from the inkjet head 11G. Specifically, the controller 5 controls the printing unit 3 to interpolate a white streak due to the non-ejection nozzle 13 by using the ejection of the ink from multiple nozzles 13 in the inkjet head 11G, including a nozzle 13 at the position corresponding to the non-ejection nozzle 13 and nozzles 13 adjacent to that corresponding nozzle 13, for a pixel having an average value of the numbers of drops of adjacent pixels larger than the prescribed value among the pixels on a line in the sub-scanning direction at the position of the non-ejection nozzle 13. Here, the multiple nozzles 13 including a nozzle 13 at the position corresponding to the non-ejection nozzle 13 and nozzles 13 adjacent to that corresponding nozzle 13 are multiple nozzles 13 within a range specified in accordance with the position of the non-ejection nozzle 13 and the peripheral-pixel adaptation amount.

Next, the operation of the inkjet printer 1 will be described.

Figure 5:
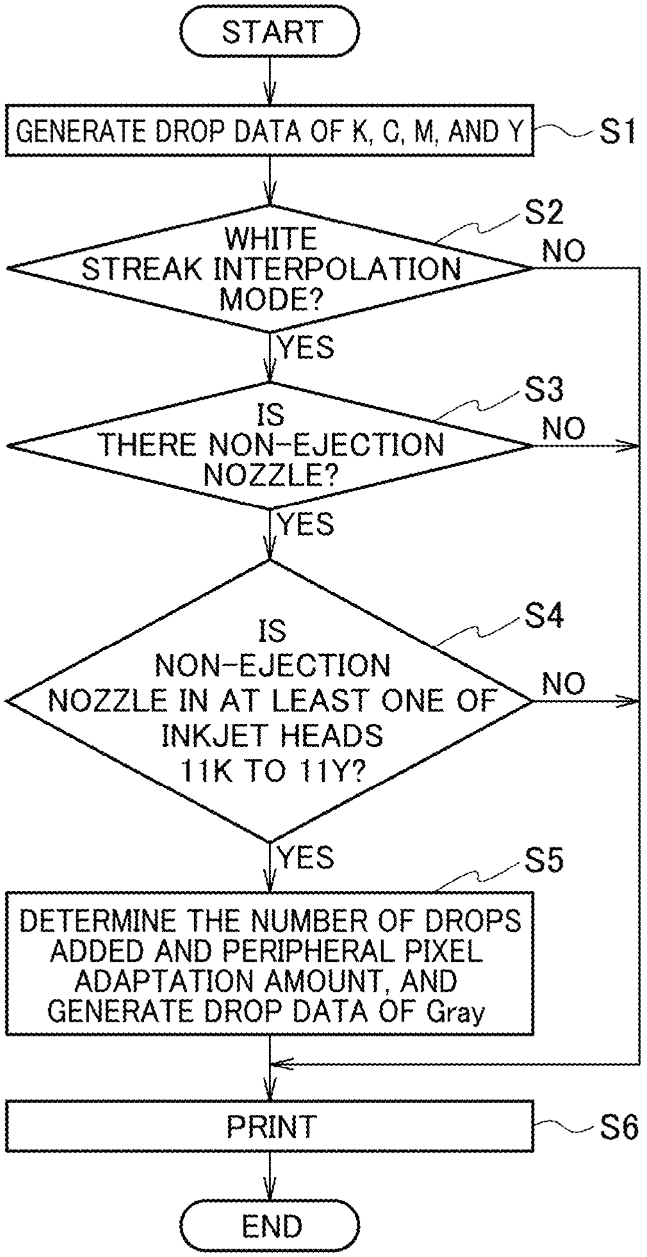
FIG. 5 is a flowchart for explaining an operation of the inkjet printer of FIG. 1.

FIG. 5 is a flowchart for explaining the operation of the inkjet printer 1. The processing of the flowchart of FIG. 5 starts when print job data in the PDL format is inputted to the inkjet printer 1.

In step S1 in FIG. 5, the controller 5 processes print job data in the PDL format inputted from an external apparatus to generate drop data of the colors (K, C, M, and Y) corresponding respectively to the ink colors ejected by the inkjet heads 11K to 11Y. The drop data of each color is data indicating the number of drops of the ink of each color for each pixel.

Specifically, first, the controller 5 generates image data of R, G, and B by performing RIP processing on the print job data. This image data of R, G, and B is, for example, data of 256 gradation levels in which each pixel is expressed with 8 bits.

Subsequently, the controller 5 generates image data of C, M, Y, and K by performing color-conversion on the image data of R, G, and B. The image data of C, M, Y, and K is, for example, data of 256 gradation levels in which each pixel is expressed with 8 bits. For example, the controller 5 can convert image data of R, G, and B into image data of C, M, Y, and K by using a color profile prepared in advance.

Then, the controller 5 generates drop data of C, M, Y, and K by performing a half-tone process on the image data of C, M, Y, and K. As the half-tone process, an error diffusion process or a dither mask process can be applied.

Subsequently, in step S2, the controller 5 determines whether or not printing in the white streak interpolation mode has been set.

If the controller 5 determines that printing in the white streak interpolation mode has been set (step S2: YES), in step S3, the controller 5 determines whether or not there is a non-ejection nozzle 13 in at least one of the inkjet heads 11.

Here, a non-ejection nozzle 13 in the inkjet heads 11K to 11G has been specified in advance, and at which position (a position in the main-scanning direction) in which inkjet head 11 the nozzle 13 is of non-ejection has been stored in the storage 4. The non-ejection nozzle 13 can be specified, for example, by printing a dedicated chart with the inkjet heads 11K to 11G, reading the printed product with a scanner, and analyzing the read data.

If the controller 5 determines that there is a non-ejection nozzle 13 (step S3: YES), in step S4, the controller 5 determines whether or not the non-ejection nozzle 13 is not in the inkjet head 11G but in at least one of the inkjet heads 11K to 11Y.

If the controller 5 determines that the non-ejection nozzle 13 is not in the inkjet head 11G but in at least one of the inkjet heads 11K to 11Y (step S4: YES), in step S5, the controller 5 determines the number of drops added and the peripheral-pixel adaptation amount.

Specifically, the controller 5 calculates an average value of the numbers of drops of adjacent pixels for each pixel on a line in the sub-scanning direction at the position of the non-ejection nozzle 13 (each pixel onto which the non-ejection nozzle 13 is intended to eject the ink) based on the position of the non-ejection nozzle 13 and the drop data of C, M, Y, and K.

Subsequently, the controller 5 determines the number of drops added and the peripheral-pixel adaptation amount by referring to the interpolation table 21, based on the calculated average value of the numbers of drops of adjacent pixels, for each pixel on the line in the sub-scanning direction at the position of the non-ejection nozzle 13. Then, the controller 5 generates drop data of Gray in which the number of drops corresponding to the number of drops added is set for each pixel on the line in the sub-scanning direction at the position of the non-ejection nozzle 13 and each of the pixels corresponding to the peripheral-pixel adaptation amount on one side and the other side in the main-scanning direction of those pixels on the line.

Subsequently, in step S6, the controller 5 controls the inkjet heads 11K to 11G to eject the inks onto the sheet P conveyed by the conveyor 2 to print an image based on the drop data of C, M, Y, K, and Gray.

In this way, the process of interpolating a white streak is performed by using the ejection of the ink from multiple nozzles 13 in the inkjet head 11G, including a nozzle 13 at the position corresponding to the non-ejection nozzle 13 and nozzles 13 adjacent to that corresponding nozzle 13, for pixels the average value of the numbers of drops of adjacent pixels of each of which is larger than a prescribed value among the pixels on the line in the sub-scanning direction at the position of the non-ejection nozzle 13.

In step S2, if the controller 5 determines that printing in the white streak interpolation mode has not been set (step S2: NO), in step S6, the controller 5 controls the inkjet heads 11K to 11Y to eject the inks onto the sheet P conveyed by the conveyor 2 to print an image based on the drop data of C, M, Y, and K.

In step S3, if the controller 5 determines that there is no non-ejection nozzle 13 (step S3: NO), in step S6, the controller 5 controls the inkjet heads 11K to 11Y to eject the inks onto the sheet P conveyed by the conveyor 2 to print an image based on the drop data of C, M, Y, and K.

In step S4, if the controller 5 determines that the non-ejection nozzle 13 is not in any of the inkjet heads 11K to 11Y (step S4: NO), in step S6, the controller 5 controls the inkjet heads 11K to 11Y to eject the inks onto the sheet P conveyed by the conveyor 2 to print an image based on the drop data of C, M, Y, and K.

Once the printing in step S6 ends, the series of operations ends.

Next, an example of the process of interpolating a white streak due to a non-ejection nozzle 13 will be described.

Figure 6:
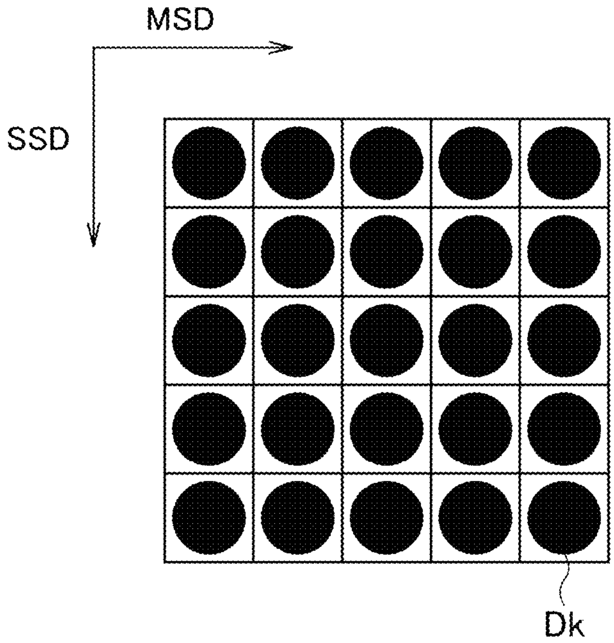
FIG. 6 is a diagram illustrating an example of a dot image of a printed image.

FIG. 6 is a diagram illustrating an example of a dot image of a printed image made by the inkjet printer 1. In FIG. 6, one square represents one pixel. The example of FIG. 6 is a dot image of a solid image printed with the ink of black ejected by the inkjet head 11K, and dots Dk are formed with the ink of black. The printed image of FIG. 6 is formed by multiple nozzles 13 within a range where there is no non-ejection nozzle 13 in the inkjet head 11K.

Figure 7:
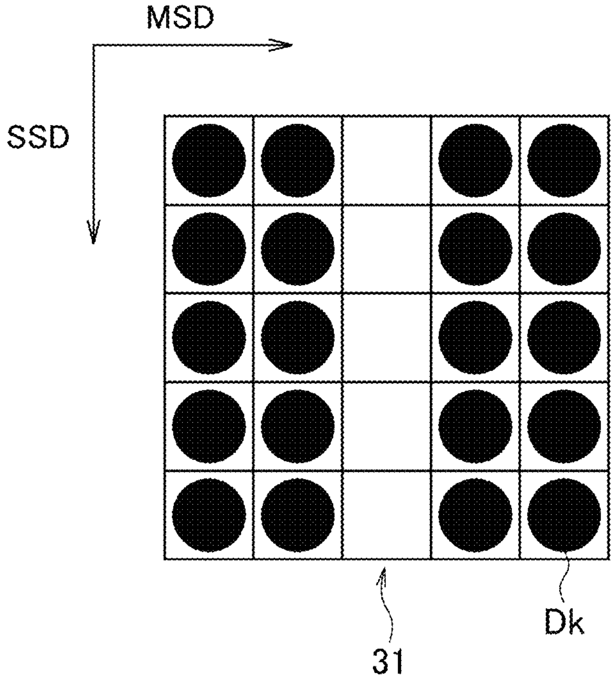
FIG. 7 is a diagram illustrating an example of a dot image of a printed image in which a white streak has occurred.

In the case where there is a non-ejection nozzle 13 among the nozzles 13 within a range where the printed image of FIG. 6 is to be printed, as illustrated in FIG. 7, a white streak 31 is generated because the ink is not ejected onto each pixel onto which the non-ejection nozzle 13 is intended to eject the ink in the printed image.

Figure 8:
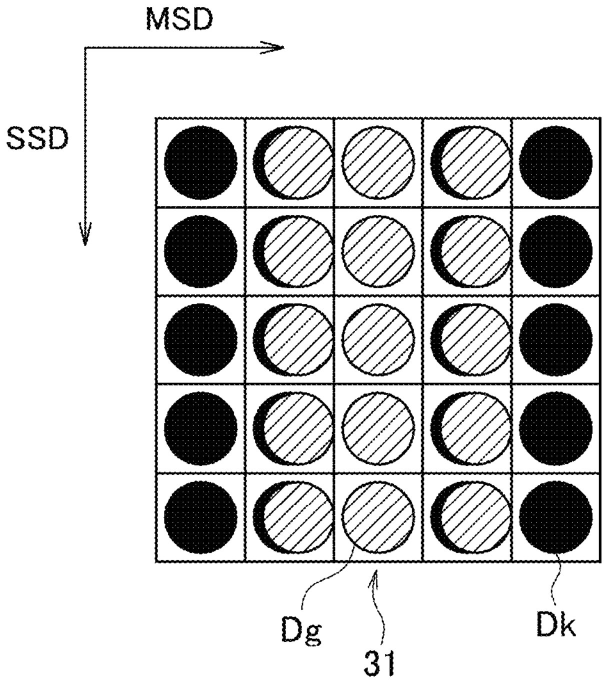
FIG. 8 is a diagram illustrating an example of a dot image of a printed image in which a white streak has been interpolated.

In this case, in the white streak interpolation mode, as illustrated in FIG. 8, the inkjet head 11G ejects the ink of gray onto each of the pixels of the white streak 31 and one pixel on each side in the main-scanning direction of the each pixel of the white streak 31, so that dots Dg are formed with the ink of gray. As a result, the white streak 31 is interpolated with the dots Dg of gray.

Here, in the example of FIG. 7, the average value of the numbers of drops of adjacent pixels in each pixel of the white streak 31 is larger than a prescribed value ("2" in the example of FIG. 4). In addition, the peripheral-pixel adaptation amount is "+1".

Figure 9:
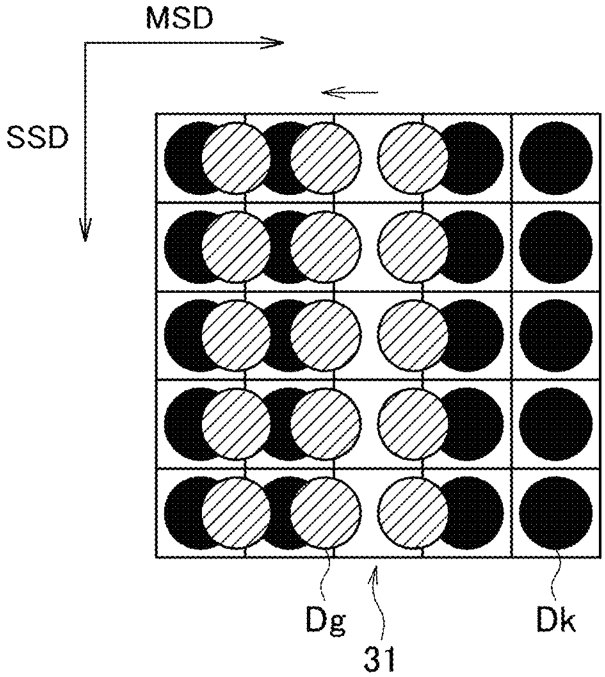
FIG. 9 is a diagram illustrating an example of a dot image of a printed image in which landing position deviation of an ink for interpolating a white streak has occurred.

As illustrated in FIG. 8, since the ink of gray is ejected onto not only each pixel of the white streak 31 but also one pixel on each side of the each pixel of the white streak 31, even when landing position deviation of the ink of gray occurs due to the meandering of the sheet P or the like, the white streak is interpolated with the dots Dg of gray as illustrated in FIG. 9.

Figure 10:
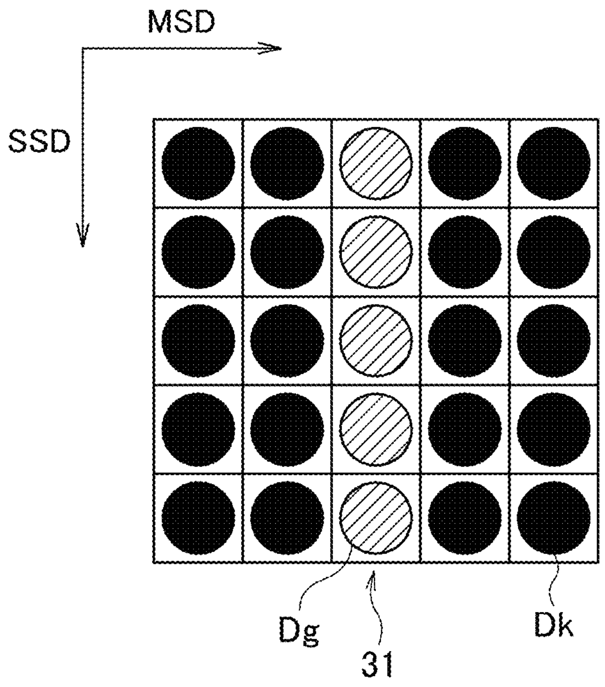
FIG. 10 is a diagram illustrating an example of a dot image of a printed image in which an ink of a different color has been ejected onto only pixels where a white streak has occurred.
Figure 11:
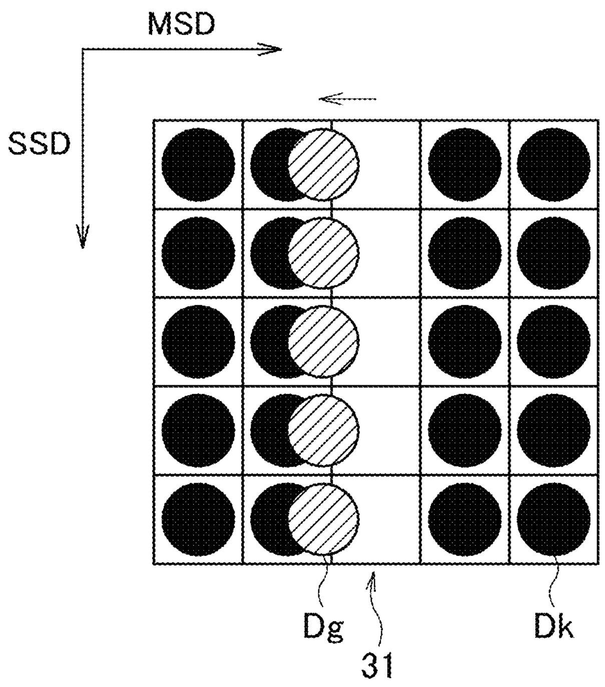
FIG. 11 is a diagram illustrating an example of a dot image of a printed image in which landing position deviation of an ink of a different color ejected onto only pixels where a white streak has occurred has occurred.

In contrast, unlike the present embodiment, in the case where the white streak 31 is interpolated by forming the dots Dg of gray only on each pixel of the white streak 31 as illustrated in FIG. 10, if landing position deviation of the ink of gray occurs, the white streak 31 cannot be sufficiently interpolated as illustrated in FIG. 11.

Figure 12:
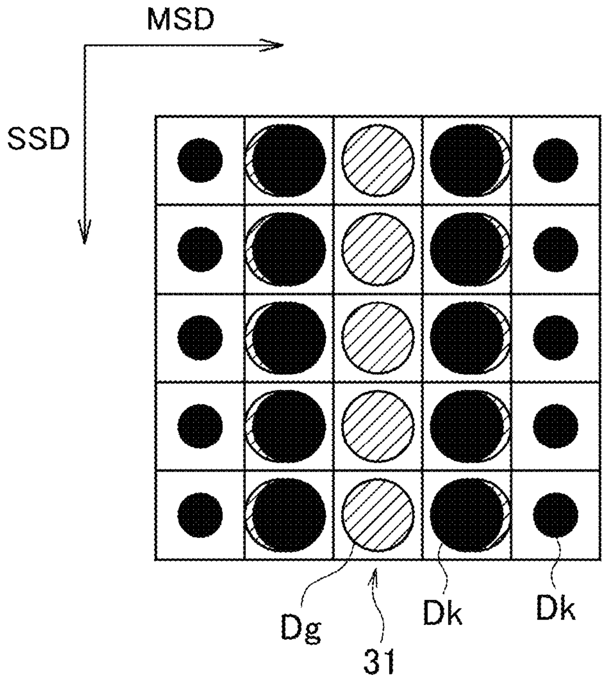
FIG. 12 is a diagram illustrating an example of a dot image of a printed image in which a black streak has appeared due to ejection of an ink for interpolating a white streak.

Here, FIG. 12 illustrates a dot image in the case where the average value of the numbers of drops of adjacent pixels in each pixel of the white streak 31 is equal to or lower than the prescribed value and in the case where the ink of gray is ejected onto each pixel of the white streak 31 and one pixel on each side in the main-scanning direction of the each pixel of the white streak 31 for interpolating the white streak 31, unlike the present embodiment.

In this case, as illustrated in FIG. 12, there is a possibility that a black streak appears because the pixel on each side in the main-scanning direction of the each pixel of the white streak 31 is emphasized by bleeding.

For this reason, in the present embodiment, as mentioned above, in the case where the average value of the numbers of drops of adjacent pixels is equal to or lower than a prescribed value, the number of drops added and the peripheral-pixel adaptation amount are set to "±0", so that the ejection of the ink for interpolating a white streak is omitted.

Here, the larger the numbers of drops of adjacent pixels, the larger the bleeding of dots of the pixels in the first place, and for this reason, it is possible to suppress a situation where a black streak becomes noticeable even when the number of drops of the ink for interpolating the white streak is increased. On the other hand, the larger the number of drops of the ink for interpolating a white streak, the larger the effect to interpolate the white streak. In addition, with a larger peripheral-pixel adaptation amount, it is more possible to reduce the possibility that the white streak cannot be sufficiently interpolated even when landing position deviation of the ink for interpolating the white streak occurs.

In view of this, in the present embodiment, as mentioned above, the number of drops added and the peripheral-pixel adaptation amount are set in accordance with the numbers of drops of adjacent pixels. Specifically, the larger the average value of the numbers of drops of adjacent pixels is, the larger the number of drops added is set to be. In addition, the larger the average value of the numbers of drops of adjacent pixels is, the larger the peripheral-pixel adaptation amount is set to be.

Next, results of experiments for the process of interpolating a white streak due to a non-ejection nozzle 13 will be described.

Figure 13A:
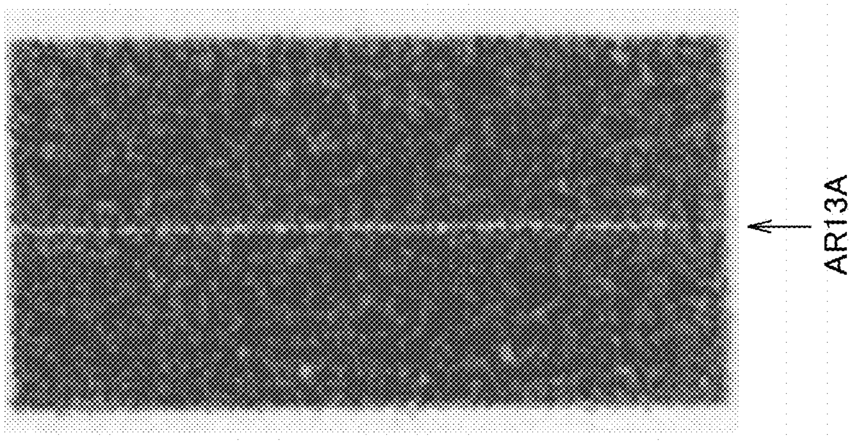
FIG. 13A is a view illustrating an example of a solid image in which a white streak has occurred.
Figure 13B:
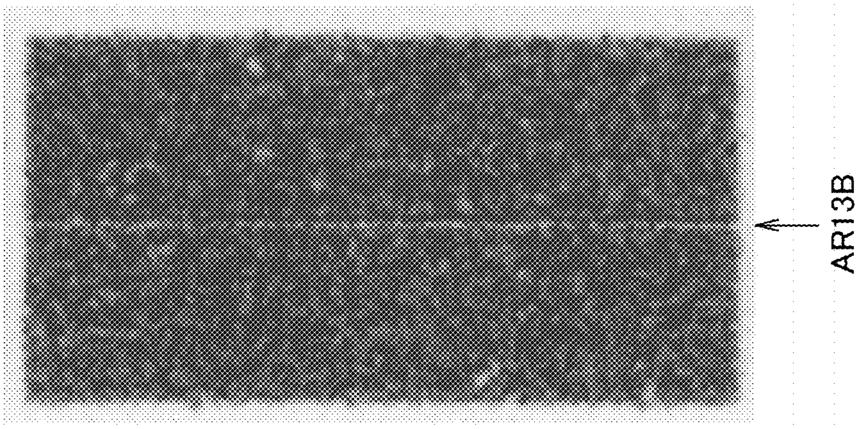
FIG. 13B is a view illustrating a printing result in a case where an ink for interpolating a white streak was ejected onto only each pixel of a white streak in printing the same solid image as that in FIG. 13A.
Figure 13C:
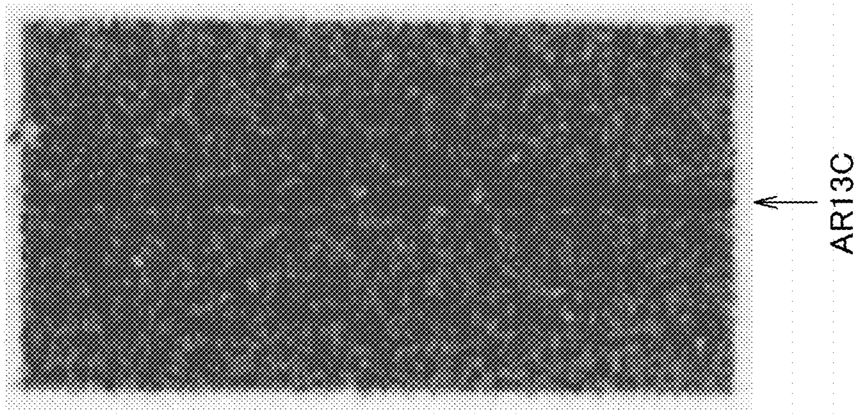
FIG. 13C is a view illustrating a printing result in a case where an ink for interpolating a white streak was ejected onto each pixel of a white streak and one pixel on each side in a main-scanning direction of the each pixel in printing the same solid image as that in FIG. 13A.

FIG. 13A is a view illustrating a solid image printed by ejecting six drops of the ink of cyan and one drop of the ink of yellow onto each pixel in the case where there was a non-ejection nozzle 13 in the inkjet head 11C which ejects the ink of cyan. Regarding the solid image of FIG. 13A, the process of interpolating a white streak was not performed in the printing, and a white streak was generated as indicated by the arrow AR13A. FIG. 13B is a view illustrating a printing result in the case where the process of interpolating a white streak was performed by ejecting the ink of gray onto only each pixel of a white streak (the width of one pixel) from the inkjet head 11G when a solid image was printed by ejecting six drops of the ink of cyan and one drop of the ink of yellow onto each pixel, in the case where there was a non-ejection nozzle 13 in the inkjet head 11C which ejects the ink of cyan as in the case of FIG. 13A. FIG. 13C is a view illustrating a printing result in the case where the process of interpolating a white streak was performed by ejecting the ink of gray onto each pixel of a white streak and one pixel on each side in the main-scanning direction of the each pixel of the white streak (the width of three pixel) from the inkjet head 11G when a solid image was printed by ejecting six drops of the ink of cyan and one drop of the ink of yellow onto each pixel, in the case where there was a non-ejection nozzle 13 in the inkjet head 11C which ejects the ink of cyan as in the case of FIG. 13A.

In the example of FIG. 13B, the white streak was not sufficiently interpolated as indicated by the arrow AR13B because of landing position deviation of the ink of gray due to the meandering of the sheet P or the like. In contrast, in the example of FIG. 13C, the effect to make the white streak less noticeable by interpolating the white streak was obtained as indicated by the arrow AR13C.

Figure 14A:
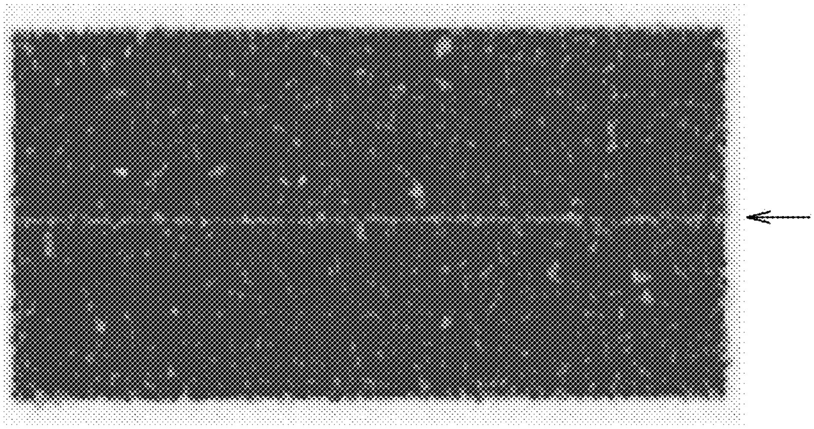
FIG. 14A is a view illustrating another example of a solid image in which a white streak has occurred.
Figure 14B:
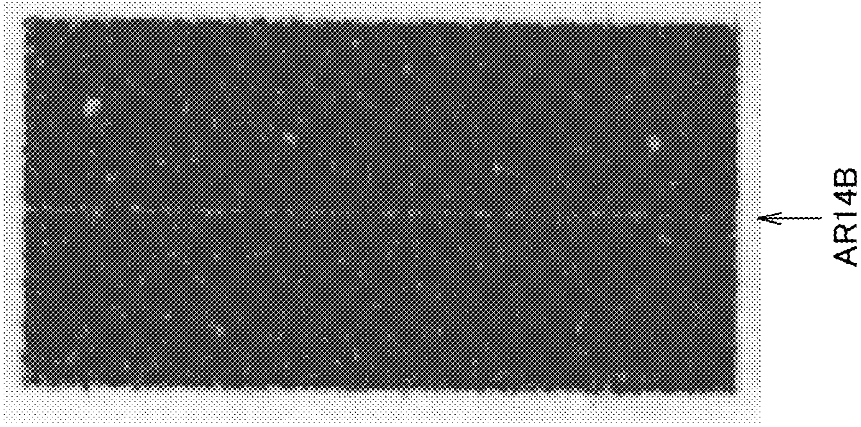
FIG. 14B is a view illustrating a printing result in a case where an ink for interpolating a white streak was ejected onto only each pixel of a white streak in printing the same solid image as that in FIG. 14A.
Figure 14C:
FIG. 14C is a view illustrating a printing result in a case where an ink for interpolating a white streak was ejected onto each pixel of a white streak and one pixel on each side in a main-scanning direction of the each pixel in printing the same solid image as that in FIG. 14A.

FIG. 14A is a view illustrating a solid image printed by ejecting two drops of each of the inks of cyan, magenta, and yellow onto each pixel in the case where there was a non-ejection nozzle 13 in the inkjet head 11C which ejects the ink of cyan. Regarding the solid image of FIG. 14A, the process of interpolating a white streak was not performed in the printing, and a white streak was generated as indicated by the arrow AR14A. FIG. 14B is a view illustrating a printing result in the case where the same process of interpolating a white streak as in FIG. 13B was performed when a solid image was printed by ejecting two drops of each of the inks of cyan, magenta, and yellow onto each pixel, in the case where there was a non-ejection nozzle 13 in the inkjet head 11C which ejects the ink of cyan as in the case of FIG. 14A. FIG. 14C is a view illustrating a printing result in the case where the same process of interpolating a white streak as in FIG. 13C was performed when a solid image was printed by ejecting two drops of each of the inks of cyan, magenta, and yellow onto each pixel, in the case where there was a non-ejection nozzle 13 in the inkjet head 11C which ejects the ink of cyan as in the case of FIG. 14A.

In the example of FIG. 14B, the white streak was not sufficiently interpolated as indicated by the arrow AR14B as in the example of FIG. 13B. In contrast, in the example of FIG. 14C, the effect to make the white streak less noticeable by interpolating the white streak was obtained as indicated by the arrow AR14C as in the example of FIG. 13C.

Figure 15A:
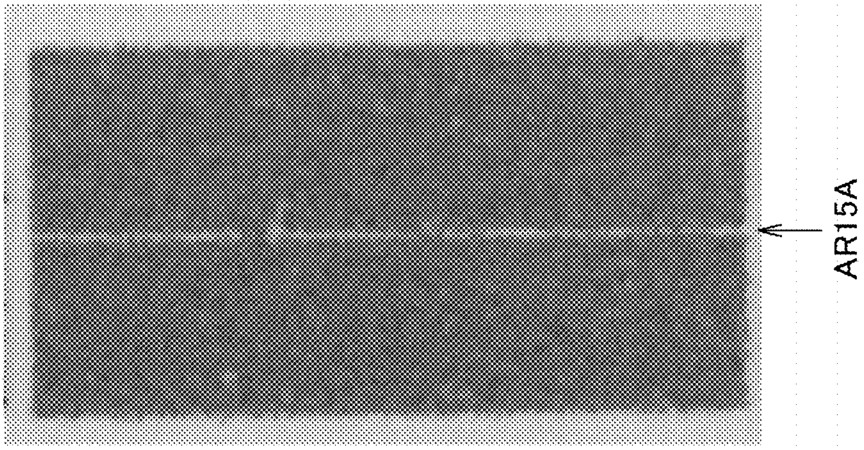
FIG. 15A is a view illustrating still another example of a solid image in which a white streak has occurred.
Figure 15B:
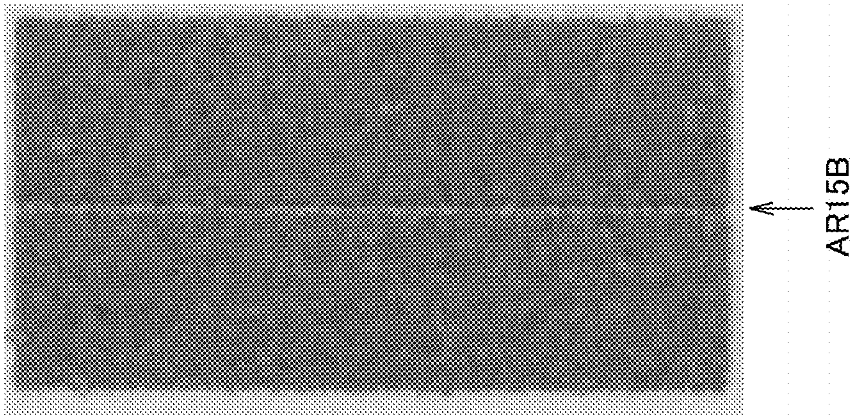
FIG. 15B is a view illustrating a printing result in a case where an ink for interpolating a white streak was ejected onto only each pixel of a white streak in printing the same solid image as that in FIG. 15A.
Figure 15C:
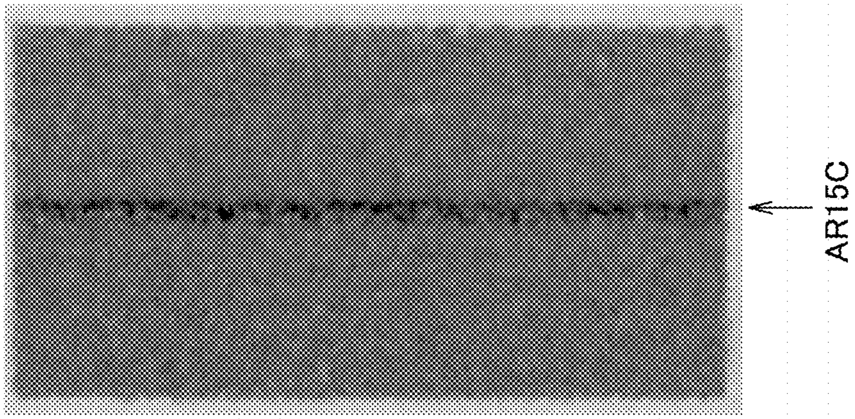
FIG. 15C is a view illustrating a printing result in a case where an ink for interpolating a white streak was ejected onto each pixel of a white streak and one pixel on each side in a main-scanning direction of the each pixel in printing the same solid image as that in FIG. 15A.

FIG. 15A is a view illustrating a solid image printed by ejecting six drops of the ink of cyan onto each pixel in the case where there was a non-ejection nozzle 13 in the inkjet head 11C which ejects the ink of cyan. Regarding the solid image of FIG. 15A, the process of interpolating a white streak was not performed in the printing, and a white streak was generated as indicated by the arrow AR15A. FIG. 15B is a view illustrating a printing result in the case where the same process of interpolating a white streak as in FIG. 13B was performed when a solid image was printed by ejecting six drops of the ink of cyan onto each pixel, in the case where there was a non-ejection nozzle 13 in the inkjet head 11C which ejects the ink of cyan as in the case of FIG. 15A. FIG. 15C is a view illustrating a printing result in the case where the same process of interpolating a white streak as in FIG. 13C was performed when a solid image was printed by ejecting six drops of the ink of cyan onto each pixel, in the case where there was a non-ejection nozzle 13 in the inkjet head 11C which ejects the ink of cyan as in the case of FIG. 15A.

In the example of FIG. 15B, the white streak was not sufficiently interpolated as indicated by the arrow AR15B as in the example of FIG. 13B. In contrast, in the example of FIG. 15C, the effect to make the white streak less noticeable by interpolating the white streak was obtained as indicated by the arrow AR15C as in the example of FIG. 13C.

Figure 16A:
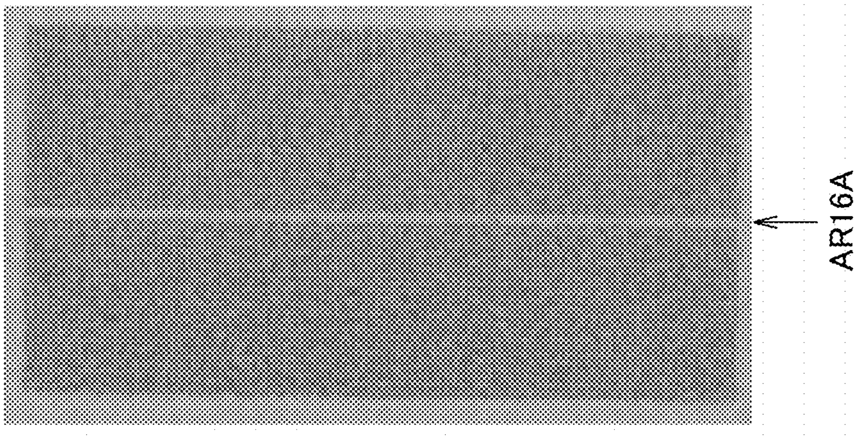
FIG. 16A is a view illustrating yet another example of a solid image in which a white streak has occurred.
Figure 16B:
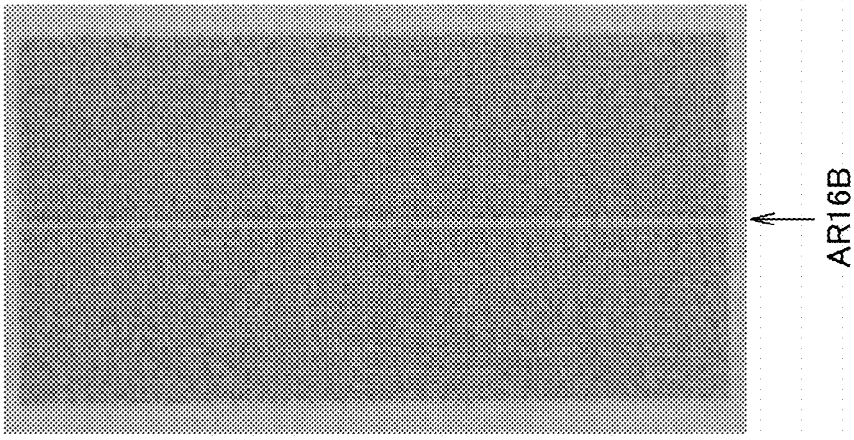
FIG. 16B is a view illustrating a printing result in a case where an ink for interpolating a white streak was ejected onto only each pixel of a white streak in printing the same solid image as that in FIG. 16A.
Figure 16C:
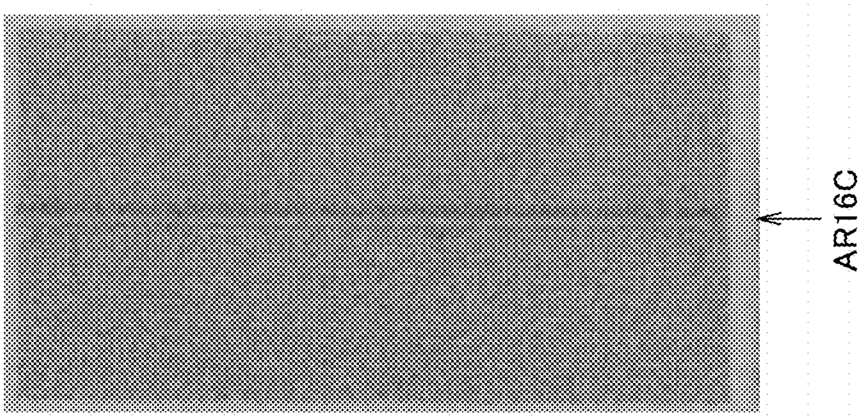
FIG. 16C is a view illustrating a printing result in a case where an ink for interpolating a white streak was ejected onto each pixel of a white streak and one pixel on each side in a main-scanning direction of the each pixel in printing the same solid image as that in FIG. 16A.

FIG. 16A is a view illustrating a solid image printed by ejecting one drop of the ink of cyan onto each pixel in the case where there was a non-ejection nozzle 13 in the inkjet head 11C which ejects the ink of cyan. Regarding the solid image of FIG. 16A, the process of interpolating a white streak was not performed in the printing, and a white streak was generated as indicated by the arrow AR16A. FIG. 16B is a view illustrating a printing result in the case where the same process of interpolating a white streak as in FIG. 13B was performed when a solid image was printed by ejecting one drop of the ink of cyan onto each pixel, in the case where there was a non-ejection nozzle 13 in the inkjet head 11C which ejects the ink of cyan as in the case of FIG. 16A. FIG. 16C is a view illustrating a printing result in the case where the same process of interpolating a white streak as in FIG. 13C was performed when a solid image was printed by ejecting one drop of the ink of cyan onto each pixel, in the case where there was a non-ejection nozzle 13 in the inkjet head 11C which ejects the ink of cyan as in the case of FIG. 16A.

In the example of FIG. 16B, the white streak was not sufficiently interpolated as indicated by the arrow AR16B as in the example of FIG. 13B. In addition, in the example of FIG. 16C, although the white streak was made less noticeable, a black streak appeared because pixels on either side of each pixel of the white streak were emphasized by bleeding, as indicated by the arrow AR16C.

As described above, in the inkjet printer 1, in the case where printing in the white streak interpolation mode has been set and there is a non-ejection nozzle 13 in at least one of the inkjet heads 11K to 11Y, the controller 5 controls the printing unit 3 to interpolate a white streak due to the non-ejection nozzle 13 by using the ejection of the ink from the inkjet head 11G. Specifically, the controller 5 controls the printing unit 3 to interpolate a white streak due to the non-ejection nozzle 13 by using the ejection of the ink from multiple nozzles 13 in the inkjet head 11G, including a nozzle 13 at the position corresponding to the non-ejection nozzle 13 and nozzles 13 adjacent to that corresponding nozzle 13, for pixels the average value of the numbers of drops of adjacent pixels of each of which is larger than a prescribed value among the pixels on a line in the sub-scanning direction at the position of the non-ejection nozzle 13.

This makes it possible to suppress a situation where a white streak due to a non-ejection nozzle 13 cannot be interpolated because of landing position deviation of the ink of gray for interpolating a white streak. As a result, it is possible to suppress a decrease in printed image quality due to a non-ejection nozzle 13.

In addition, the controller 5 controls the number of drops added and the peripheral-pixel adaptation amount based on the numbers of drops of adjacent pixels for each pixel on the line in the sub-scanning direction at the position of the non-ejection nozzle 13 (each pixel onto which the non-ejection nozzle 13 is intended to eject the ink). This makes it possible to reduce the possibility that a white streak cannot be sufficiently interpolated, while suppressing a situation where a black streak becomes noticeable due to the ejection of the ink of gray for interpolating a white streak.

In addition, in the inkjet printer 1, the ink of gray which is ejected by the inkjet head 11G for interpolating a white streak is an achromatic ink having a higher brightness than that of the ink of black having the lowest brightness among the inks of black, cyan, magenta, and yellow which are ejected respectively by the other inkjet heads 11K to 11Y. This makes it possible to interpolate a white streak while suppressing a decrease in printed image quality occurring when an ink for interpolating a white streak is excessively noticeable.

Note that although in the above-described embodiment, the number of drops added and the peripheral-pixel adaptation amount are controlled based on the average value of the numbers of drops of adjacent pixels, only one of the number of drops added and the peripheral-pixel adaptation amount may be controlled. It is only necessary to control at least one of the number of drops added and the peripheral-pixel adaptation amount based on the numbers of drops (ejection amount) onto pixels adjacent to each pixel onto which a non-ejection nozzle 13 is intended to eject the ink in a printed image.

In addition, at least one of the number of drops added and the peripheral-pixel adaptation amount may be controlled based on the brightness of pixels adjacent to each pixel onto which the non-ejection nozzle 13 is intended to eject the ink in a printed image. For example, at least one of the number of drops added and the peripheral-pixel adaptation amount may be controlled based on an average value of the brightness of a pixel onto which a nozzle 13 adjacent to the front side of a non-ejection nozzle 13 ejects the ink in a printed image and the brightness of a pixel onto which a nozzle 13 adjacent to the rear side of the non-ejection nozzle 13 ejects the ink in the printed image, for each pixel on a line in the sub-scanning direction at the position of the non-ejection nozzle 13.

Specifically, the number of drops added may be increased as the brightness of pixels adjacent to the pixel onto which the non-ejection nozzle 13 is intended to eject the ink decreases. In addition, the peripheral-pixel adaptation amount may be increased as the brightness of pixels adjacent to each pixel onto which the non-ejection nozzle 13 is intended to eject the ink decreases. This makes it possible to further reduce the possibility that a white streak cannot be sufficiently interpolated, while suppressing a situation where a black streak becomes noticeable due to the ejection of the ink of gray for interpolating a white streak.

In addition, at least one of the number of drops added and the peripheral-pixel adaptation amount may be controlled based on the brightness and hue of pixels adjacent to each pixel onto which the non-ejection nozzle 13 is intended to eject the ink.

Here, the brightness and hue of each pixel in a printed image can be obtained by known methods from image data of R, G, and B obtained by performing RIP processing on print job data.

In addition, the above-mentioned embodiment is configured such that interpolation of a white streak is performed by using the inkjet head 11G in the case where printing in the white streak interpolation mode has been set. However, interpolation of a white streak may be performed by using the inkjet head 11G without setting an operation mode like the white streak interpolation mode.

In addition, the number of drops (ejection amount) of the ink of a nozzle 13 adjacent to at least one side of a non-ejection nozzle 13 in an inkjet head 11 in which the non-ejection nozzle 13 is may be increased while interpolation of a white streak is performed by using the inkjet head 11G as described above. This makes it possible to make a white streak due to a non-ejection nozzle 13 much less noticeable.

In addition, in the above-described embodiment, multiple nozzles 13 in the inkjet head 11G, including a nozzle 13 at the position corresponding to a non-ejection nozzle 13 and nozzles on either side of that corresponding nozzle 13 are used for interpolating a white streak. However, the nozzle 13 used for interpolating a white streak, other than the nozzle 13 at the position corresponding to anon-ejection nozzle 13, may be on only one of the front and rear sides of the nozzle 13 at the position corresponding to the non-ejection nozzle 13. The nozzles 13 used for interpolating a white streak only have to be multiple nozzles including a nozzle at the position corresponding to a non-ejection nozzle and at least one nozzle adjacent to that corresponding nozzle.

Even in the case where the nozzle 13 used for interpolating a white streak, other than the nozzle 13 at the position corresponding to a non-ejection nozzle 13, is on only one of the front and rear sides of the nozzle 13 at the position corresponding to the non-ejection nozzle 13, it is possible to suppress a situation where a white streak due to the non-ejection nozzle 13 cannot be interpolated because of landing position deviation of the ink for interpolating a white streak as compared with the case where a white streak is interpolated by using only the nozzle 13 at the position corresponding to the non-ejection nozzle 13.

In addition, the above-described embodiment is configured such that the inkjet printer 1 includes 5 nozzle arrays 12, the ink colors ejected by these nozzle arrays 12 are black, cyan, magenta, yellow, and gray, and interpolation of a white streak is performed by using the ink of gray. However, the number of the nozzle arrays 12 and the combination of ink colors are not limited to this. It suffices that the inkjet printer includes multiple nozzle arrays, and a nozzle array for performing interpolation is configured to eject an achromatic ink having a higher brightness than that of the ink having the lowest brightness among the inks ejected by the other nozzle arrays.

In addition, the configuration is not limited to one in which a specific nozzle array (ink color) is used for interpolating a white streak due to a non-ejection nozzle in the other nozzle arrays. It suffices that in the case where there is a nozzle array including a non-ejection nozzle among multiple nozzle arrays, a white streak due to the non-ejection nozzle is interpolated by using a nozzle array different from the nozzle array including the non-ejection nozzle.

In addition, in the above-described embodiment, in the case where the average value of the numbers of drops of adjacent pixels is equal to or lower than the prescribed value, ejection of the ink for interpolating a white streak is omitted. However, depending on the combination of ink colors ejected by the respective nozzle arrays, it is possible to perform the ejection of the ink for interpolating a white streak without omission, irrespective of the number of drops of an adjacent pixel (the number of drops onto a pixel adjacent to a pixel onto which a non-ejection nozzle 13 is intended to eject the ink).

In addition, although the above-described embodiment has been described as the case where the inkjet head 11 is of multi-drop system, the configuration is not limited to this. The inkjet head only has to be one in which the ejection amount of an ink ejected from a nozzle per pixel can be adjusted to multiple levels. For example, the inkjet head may be one in which the ejection amount of an ink per pixel can be adjusted to multiple levels by using the size of an ink drop ejected by a nozzle in a single ejection operation.

In addition, although in the above-described embodiment, the inkjet printer 1 of the line type has been described, the present invention can be applied to an inkjet printer of the serial type as well.

Embodiments of the present disclosure have the following configurations, for example.

An inkjet printer includes nozzle arrays and a controller. Each of the nozzle arrays includes nozzles arranged in a row along a nozzle array direction. The nozzle arrays are arranged in parallel with each other in a direction perpendicular to the nozzle array direction. The controller is configured to perform such control that in a case where the nozzle arrays include a first nozzle array including a non-ejection nozzle, a defect in a printed image due to the non-ejection nozzle is interpolated by using ejection of an ink by a first nozzle and at least one second nozzle in a second nozzle array different from the first nozzle array among the nozzle arrays, the first nozzle being at a position corresponding to a pixel onto which the non-ejection nozzle is intended to eject an ink, the at least one second nozzle being adjacent to the first nozzle.

The controller may be configured to control at least one of an ejection amount of the ink in each of the first nozzle and the at least one second nozzle and a number of the at least one second nozzle, based on an ejection amount of the ink onto a pixel adjacent, in the nozzle array direction, to the pixel onto which the non-ejection nozzle is intended to eject the ink, in the printed image.

The controller may be configured to control at least one of an ejection amount of the ink in each of the first nozzle and the at least one second nozzle and a number of the at least one second nozzle, based on brightness of a pixel adjacent, in the nozzle array direction, to the pixel onto which the non-ejection nozzle is intended to eject the ink, in the printed image.

The controller may be configured to control at least one of an ejection amount of the ink in each of the first nozzle and the at least one second nozzle and a number of the at least one second nozzle, based on an ejection amount of the ink onto a pixel adjacent, in the nozzle array direction, to the pixel onto which the non-ejection nozzle is intended to eject the ink, and brightness of the adjacent pixel, in the printed image.

Among the nozzle arrays, the second nozzle array may be a nozzle array configured to eject an achromatic ink having a higher brightness than brightness of an ink having a lowest brightness among inks ejected by the other nozzle arrays.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer for printing a printed image on a sheet conveyed in sheet conveying direction comprising:

a plurality of nozzle arrays, spaced apart in the sheet conveying direction, each array including spaced-apart nozzles arranged in a row along a nozzle array direction perpendicular to the sheet conveying direction, wherein the plurality of spaced apart nozzle arrays include a first nozzle array, and a second nozzle array, different from the first nozzle array, and including a plurality of nozzles having a first nozzle and at least one second nozzle adjacent to the first nozzle; and a controller, wherein, in a case where the first nozzle array includes a non-ejection nozzle failing to eject ink onto a pixel of the printed image, thereby creating a defect in the printed image, and the first nozzle of the second nozzle array is positioned at a position corresponding to the position of the non-ejection nozzle of the first nozzle array to eject ink onto the pixel to compensate for the defect, the controller is configured to control the first nozzle of the second nozzle array to eject ink onto the pixel, and to control the at least one second nozzle of the second nozzle array, adjacent to the first nozzle, to eject ink onto the image at a position adjacent the pixel, thereby compensating for the defect caused by the non-ejection nozzle of the first nozzle array using the first nozzle and the at least second nozzle of the second nozzle array.

2. The inkjet printer according to claim 1, wherein the controller is configured to control at least one of an ejection amount of the ink in each of the first nozzle and the at least one second nozzle, and the number of nozzles in the second nozzle array that eject ink to compensate for the pixel not printed by the non-ejection nozzle of the first nozzle array, based on an ejection amount of the ink onto a pixel adjacent, in the nozzle array direction, to the pixel onto which the non-ejection nozzle fails to eject the ink, in the printed image.

3. The inkjet printer according to claim 1, wherein the controller is configured to control at least one of an ejection amount of the ink in each of the first nozzle and the at least one second nozzle, and the number of nozzles in the second nozzle array that eject ink to compensate for the pixel not printed by the non-ejection nozzle of the first nozzle array, based on brightness of a pixel adjacent, in the nozzle array direction, to the pixel onto which the non-ejection nozzle fails to eject the ink, in the printed image.

4. The inkjet printer according to claim 1, wherein the controller is configured to control at least one of an ejection amount of the ink in each of the first nozzle and the at least one second nozzle, and the number of nozzles in the second nozzle array that eject ink to compensate for the pixel not printed by the non-ejection nozzle of the first nozzle array, based on an ejection amount of the ink onto a pixel adjacent, in the nozzle array direction, to the pixel onto which the non-ejection nozzle fails to eject the ink, and brightness of the adjacent pixel, in the printed image.

5. The inkjet printer according to claim 1, wherein among the plurality of nozzle arrays, the second nozzle array is a nozzle array configured to eject an achromatic ink having a higher brightness than a brightness of an ink having a lowest brightness among inks ejected by the other nozzle arrays.

* * * * *